United States Patent [19]

Ishikawa

[11] 4,367,923
[45] Jan. 11, 1983

[54] LIQUID CRYSTAL DISPLAY UNIT FOR AN AUTOMOTIVE VEHICLE

[75] Inventor: Masao Ishikawa, Yokohama, Japan

[73] Assignee: Nissan Motor Company, Limited, Yokohama, Japan

[21] Appl. No.: 173,883

[22] Filed: Jul. 31, 1980

[30] Foreign Application Priority Data

Aug. 1, 1979 [JP] Japan .................................. 54-97379

[51] Int. Cl.³ ............................................ G02F 1/133
[52] U.S. Cl. ..................................... 350/345; 350/486
[58] Field of Search ................. 350/345, 338, 6.1, 6.5, 350/448, 486; 40/562

[56] References Cited

U.S. PATENT DOCUMENTS 3,838,909 10/1974 Fitzgibbons ......................... 350/345

FOREIGN PATENT DOCUMENTS

| 2512548 | 9/1975 | Fed. Rep. of Germany ...... 350/345 |
| 2546081 | 3/1977 | Fed. Rep. of Germany . |
| 297065 | 9/1928 | United Kingdom . |
| 304408 | 1/1929 | United Kingdom .................. 40/562 |
| 308669 | 3/1929 | United Kingdom . |
| 355952 | 3/1931 | United Kingdom . |
| 1464875 | 2/1977 | United Kingdom ................. 350/345 |
| 1475195 | 6/1977 | United Kingdom . |

OTHER PUBLICATIONS

Elektronik 1977, Heft 11, Seite 52.

*Primary Examiner*—John K. Corbin
*Assistant Examiner*—Paul Dzierzynski
*Attorney, Agent, or Firm*—Lane, Aitken, Kice & Kananen

[57] ABSTRACT

The present invention relates to a display unit for an automotive vehicle using passive display elements such as liquid crystals. The liquid crystal display unit according to the present invention comprises substantially a liquid crystal display device, a light source selectively turned on and off, and an illumination selection mechanism which selectively collects ambient light or uses the light source in order to illuminate the display. Thus the method of illumination can be adapted to the ambient light conditions.

6 Claims, 7 Drawing Figures

LIQUID CRYSTAL DISPLAY UNIT FOR AN AUTOMOTIVE VEHICLE

BACKGROUND OF THE INVENTION

1. Field of the Invention

The present invention relates to a display unit for an automotive vehicle using a passive visual display element such as a liquid crystal device.

2. Description of the Prior Art

In recent years, passive visual display elements such as liquid crystal devices have found extensive use in display units for automotive vehicles. Such a passive display element does not emit light itself but provides a desired display pattern by controlling the passage or reflection of incident light.

A typical example of such a display element is a liquid crystal device. This is constructed by sandwiching a liquid crystal material between a pair of polarizing plates and providing pairs of electrodes of shape suitable to provide the desired display patterns. The application of a voltage across the liquid crystal material makes the polarizing plane of the liquid crystal material rotate so that the incident light from an external light source (for example, an illumination lamp) is passed selectively through the two polarizing plates to obtain the desired display pattern. Thus a change in the voltage applied across the liquid crystal material causes a change in the transparency of the liquid crystal material so that the quantity of light passing through the liquid crystal material is controlled to obtain a desired display pattern.

A conventional liquid crystal display element comprises a liquid crystal display device and an illumination lamp. The liquid crystal material of twisted nematic type is sealed between transparent glass plates on which are provided pairs of transparent electrodes. Two polarizing filters are provided on the outer surfaces of the transparent glass plates, with their polarizing axes orthogonal. A translucent diffusing panel is attached to the outer surface of one of the polarizing filters.

When the illumination lamp is turned on, a light is diffused evenly by the translucent panel, polarized by the first polarizing filter, and then arrives at the liquid crystal material. If a voltage is applied across part of the liquid crystal, the plane of polarization of light is rotated as it passes through that part. Thus whether or not light passes through the second polarizing filter is determined by the voltage across the liquid crystal, and thus a display of the desired pattern is obtained.

However, there are some problems described below in using such conventional liquid crystal display elements: wasteful power consumption and shorter life of the illumination lamp due to continuous lamp illumination even under bright ambient light such as daytime, and lower performance and reduced life of the liquid crystal display device due to the continuously applied heat generated by the light source.

On the other hand, in addition to liquid crystal display devices of the type described above, there is a liquid crystal display device of the type where a half-silvered mirror is used. The mirror reflects external sunlight to act as illumination of the device under light ambient conditions such as during the daytime, and while under dark ambient conditions such as during the nighttime, a light source positioned at the opposite side of the mirror is turned on to illuminate the device. In this type of liquid crystal display device a half-silvered mirror provides a means for collecting either ambient light or light from the light source for the liquid crystal display device.

Therefore, there arises another problem that the transmittivity and reflectivity of the mirror have an unfavorable effect on the contrast level and thus the clearness of the liquid crystal display device.

BRIEF SUMMARY OF THE INVENTION

It is an object of the present invention to provide a liquid crystal display unit which uses incident sunlight to illuminate the liquid crystal display elements under bright ambient conditions and, on the other hand, uses light from a light source such as an illumination lamp under dark ambient conditions and furthermore avoids the use of a half-silvered mirror.

BRIEF DESCRIPTION OF THE DRAWINGS

The features and advantages of the liquid crystal display device according to the present invention will be more clearly appreciated from the following description taken in conjunction with the accompanying drawings in which like reference numerals designate corresponding elements, and in which.

DESCRIPTION OF THE PREFERRED EMBODIMENTS

Figure 1:
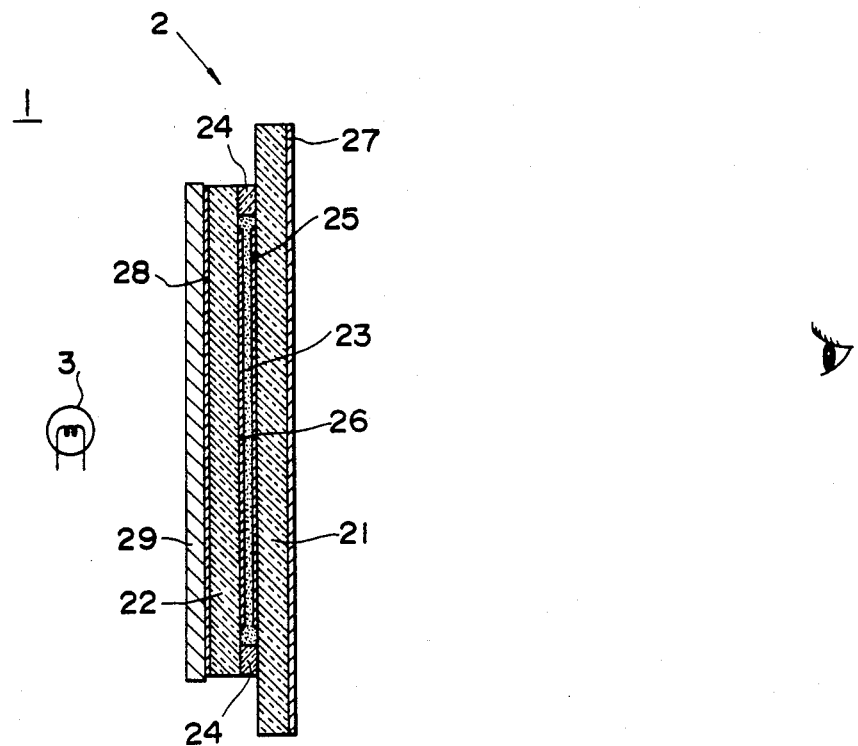
FIG. 1 is a cross-sectional view of a conventional liquid crystal display unit.

To facilitate understanding of the present invention, a brief reference will be made to a conventional liquid crystal display unit as illustrated in FIG. 1, and generally indicated by numeral 1. The liquid crystal display unit consists essentially of a liquid crystal display device 2 and illumination lamp 3. The liquid crystal display device 2 comprises substantially two transparent glass plates 21 and 22, liquid crystal material 23 in the twisted nematic phase sealed between the glass plates 21 and 22 with a sealing member 24, corresponding pairs of transparent electrodes 25 and 26 positioned in parallel with each other between the glass plates 21 and 22, two polarizing filters 27 and 28 positioned on the outer surfaces of the glass plates 21 and 22, respectively, and a translucent light diffusion plate 29 located on the outer surface of the polarizing filter 28. In this case, the illumination lamp 3 is positioned at a predetermined distance to the left of the liquid crystal display device, as seen in the drawing. The light diffusion plate 29 is, therefore, located to the left of the liquid crystal display device 2.

When the illumination lamp 3 is turned on, the light is diffused evenly through the light diffusion plate 29, polarized by the polarizing filter 28, and passes into the liquid crystal material 23 through the glass plate 22 and transparent electrode 26. When the light passes through the electrode 26, the voltage applied across the pairs of electrodes 25 and 26 is so controlled as to allow the liquid crystal display device 2 to display a desired pattern according to the shape of the pairs of transparent electrodes 25 and 26.

Such a conventional liquid crystal display device has many shortcomings: since the illumination of the liquid crystal display device is obtained from a light source, the light source must be kept illuminated even under light ambient conditions such as in the daytime. Therefore, this results in shortened life of the light source and lowered performance of the liquid crystal display device due to radiated heat from the light source. Apart from this type of conventional liquid crystal display unit, there is a liquid crystal display unit of another type, in which a half-silvered mirror is used to reflect external light into the liquid crystal display device under light ambient conditions and a light source positioned at the opposite side of the half-silvered mirror is turned on and the light from the light source which is transmitted by the mirror is used to illuminate the liquid crystal display.

Such a liquid crystal display unit has different shortcomings from the other conventional liquid crystal display unit described before. Although the power consumption and life of the light source are no longer problems, the transmittivity and reflectivity of the half-silvered mirror adversely affect the amount of light collected from the ambient light or from the light source thus reducing the display contrast.

The liquid crystal display unit according to the present invention illuminates the display element by applying to the liquid crystal display element external light under light ambient conditions to the liquid crystal display element and light from a light source such as an electric bulb under a dark ambient conditions.

According to the present invention, the liquid crystal display unit comprises substantially a liquid crystal display device having a front side and a back side and disposed to be viewed from the front side thereof, a light source with a switch, a means for introducing ambient light, means for switching the passage of light between external light from the light introducing means and light from the light source, and a diffusion plate for diffusing the light from the switching means into the liquid crystal display element. In a preferred embodiment, the switching means moves between a first position and second position according to the ambient brightness conditions. A means for driving the switching member includes a motor, magnetic solenoid, and vacuum actuator.

According to the present invention, alternation between use of ambient light and of the light source solves the abovementioned problems associated with wasteful power consumption, light intensity, and heat dissipation of the light source as well as display contrast ratio.

Figure 2:
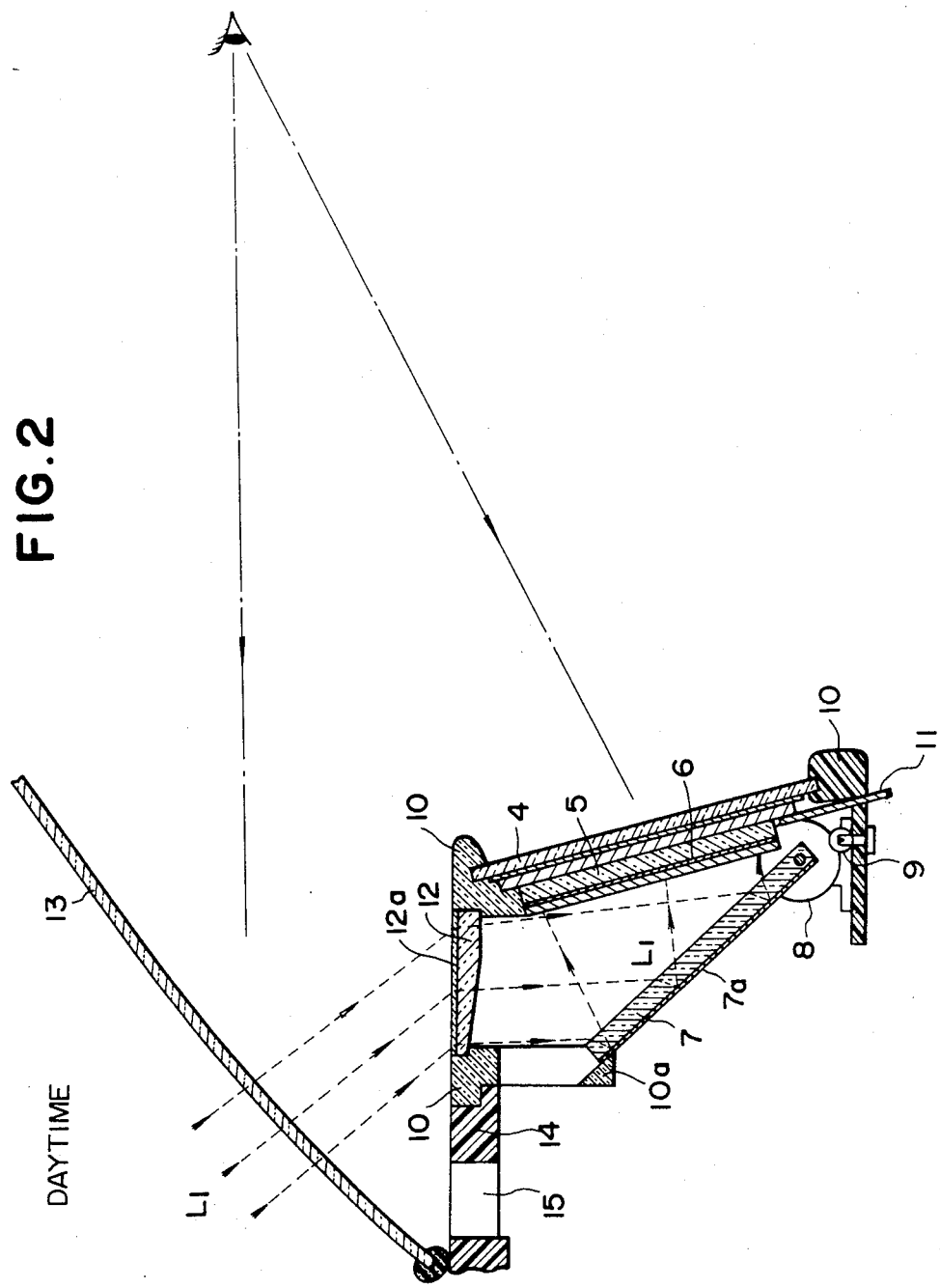
FIG. 2 is a cross-sectional view of a preferred embodiment of the present invention under light ambient conditions such as in daytime.
Figure 3:
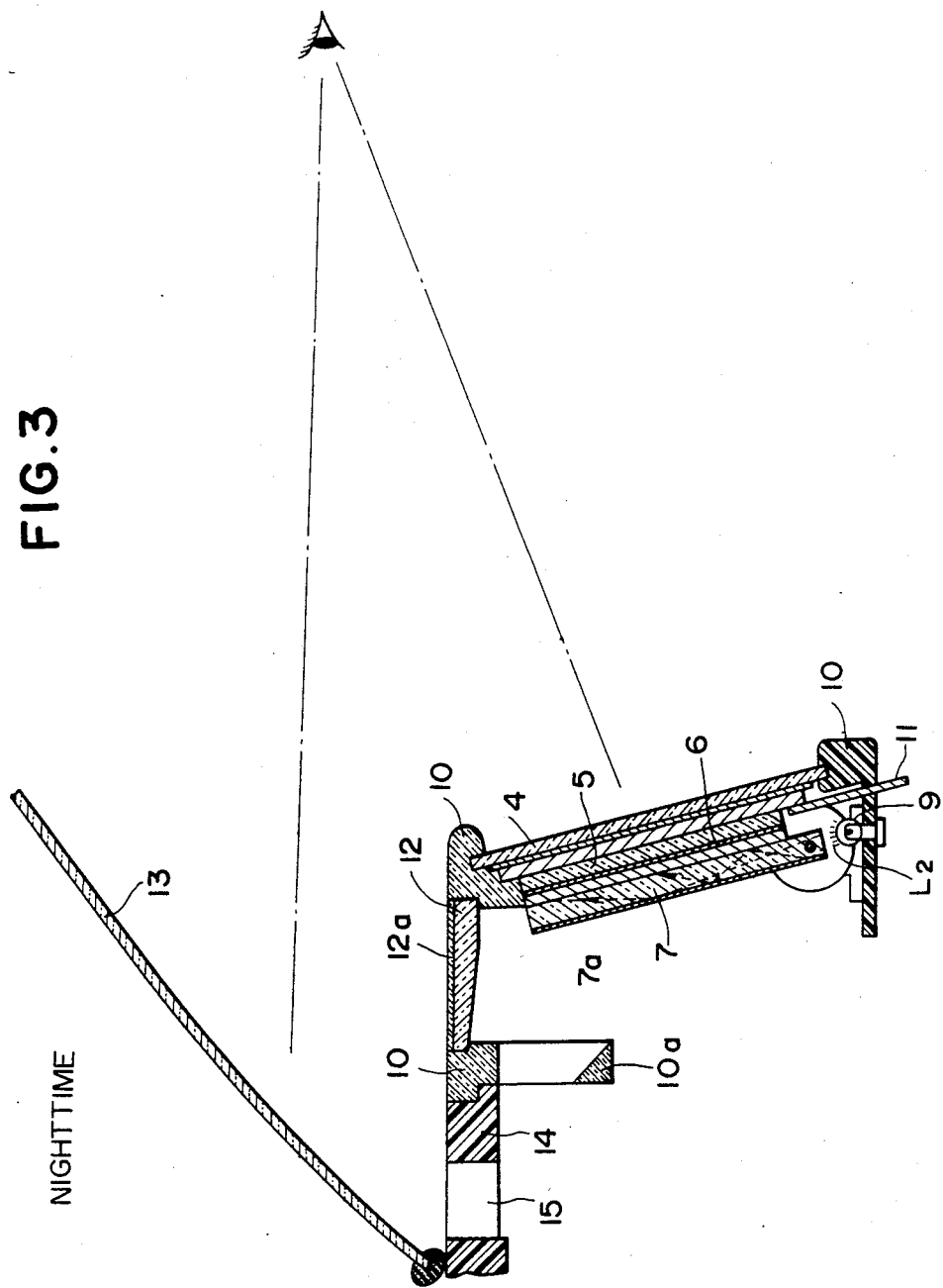
FIG. 3 is a cross sectional view of a preferred embodiment of the present invention under dark ambient conditions such as in nighttime.
Figure 4:
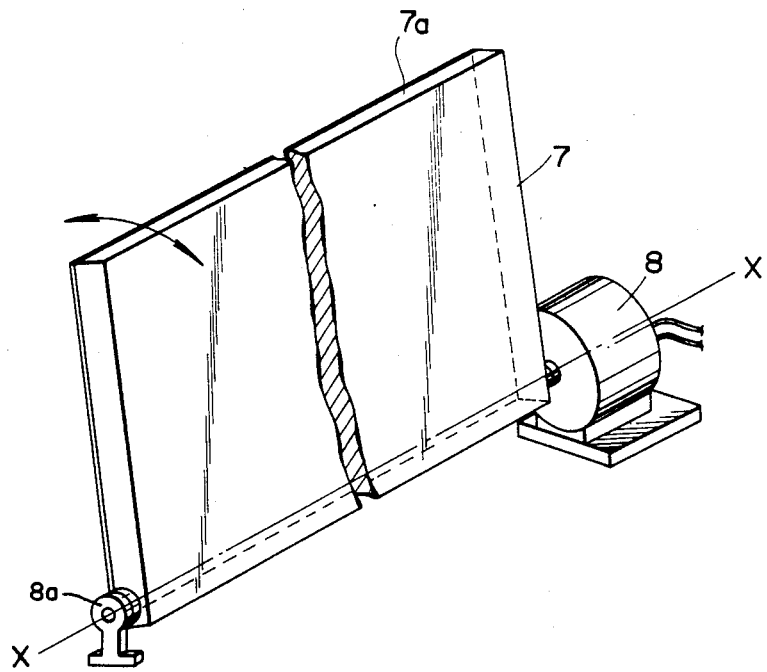
FIG. 4 is a perspective view of a preferred embodiment of the present invention mainly showing a light introducing means.

With reference to the drawings there is now described the preferred embodiments of the present invention. FIGS. 2 through 4 show one preferred embodiment of the present invention applied to an automotive vehicle. In FIGS. 2 and 3, numeral 4 designates a protective panel located in front of the display unit, and made of a anti-reflection coated transparent glass, and numeral 5 designates a liquid crystal display device. The liquid crystal display device 5 is constructed as shown in FIG. 1. Numeral 6 designates a diffusion plate for diffusing the light incident on the rear of the display device 5 to illuminate evenly the entire display area. The light diffusion plate 6 may be of, for example, a milky translucent thin-film resin. Numeral 7 designates a member for introducing light made of a transparent acrylic resin, at the rear surface of which a light reflection layer 7a formed by an aluminum deposit is provided. The light introducing member 7 takes two positions: a position leaning against a stopper 10a as shown in FIG. 2 (this position is called "daytime illumination position") and a position where the light introducing member 7 is brought up in contact with the light diffusion plate 6 as shown in FIG. 3 (this position is called "nighttime illumination position"). Numeral 9 designates an illumination light source attached to an instrument panel 10 positioned below the light introducing member 7. Numeral 11 designates a connection to the liquid crystal device. A signal from a driving circuit is inputted to the connection 11 (the driving circuit is not shown). Numeral 12 designates a light introducing lens made of transparent resin or glass which receives external light $L_1$ from a front windshield 13 of the automotive vehicle. Numeral 14 designates an instrument fixing member for fixing the instrument. Numeral 15 designates a defroster hole formed in the instrument fixing member 14. The outer surface of the light introducing lens 12 (which faces the front windshield 13) is provided with an anti-reflection coating 12a to prevent the formation of distracting reflections in the front windshield.

FIG. 4 is a perspective view of the light introducing means including the member 7 used in the liquid crystal display unit described above. The light introducing member 7 has a reflective layer 7a on its rear surface, and is supported by a bearing 8a and a motor 8, so as to be rotatable about the axis X—X by the motor 8.

Of course, other means such as a solenoid, vacuum actuator, or bimetallic strip can be used in place of the motor 8 for rotating the light introducing member 7.

As shown in FIG. 2, under light ambient conditions external light $L_1$ from outside of the automotive vehicle always arrives at the light introducing lens 12 through the front windshield 13. The light introducing lens 12 transmits the light $L_1$ into the light introducing member 7 whose reflection layer 7a then reflects the light $L_1$ into the light diffusion plate 6. The light introducing lens 12 is preferably in the form of a convex lens so as to apply the incident light envely over the light introducing member 7. The light $L_1$ passing through the light diffusion plate 6 is diffused to illuminate the liquid crystal display device 5 evenly. In the liquid crystal display device 5, a pattern is displayed according to the shape of the transparent electrodes and the voltages applied thereto. Since the brightness of the display pattern varies automatically according to the brightness of the exteral light, there is a close correlation between the brightness of the display unit and of the external environment for the driver of the automotive vehicle. Consequently, the display unit appears to the eye to be of constant visibility. In this case, the liquid crystal display unit according to the present invention consumes very little electric power since the illumination light source 9 need not be turned on under light ambient conditions such as in daytime.

FIG. 3 shows the liquid crystal display unit of the present invention in the position when the environment is dark as in nighttime. In this arrangement, the light introducing member 7 is brought in contact with the light diffusion plate 6. When the light source 9 is turned on, the light $L_2$ from the illumination light source 9 enters the light introducing member 7 at its lower edge surface. The light $L_2$ reflected by the reflection layer 7a is diffused evenly by the light diffusion plate 6 to illuminate the liquid crystal display device 5.

Figure 5:
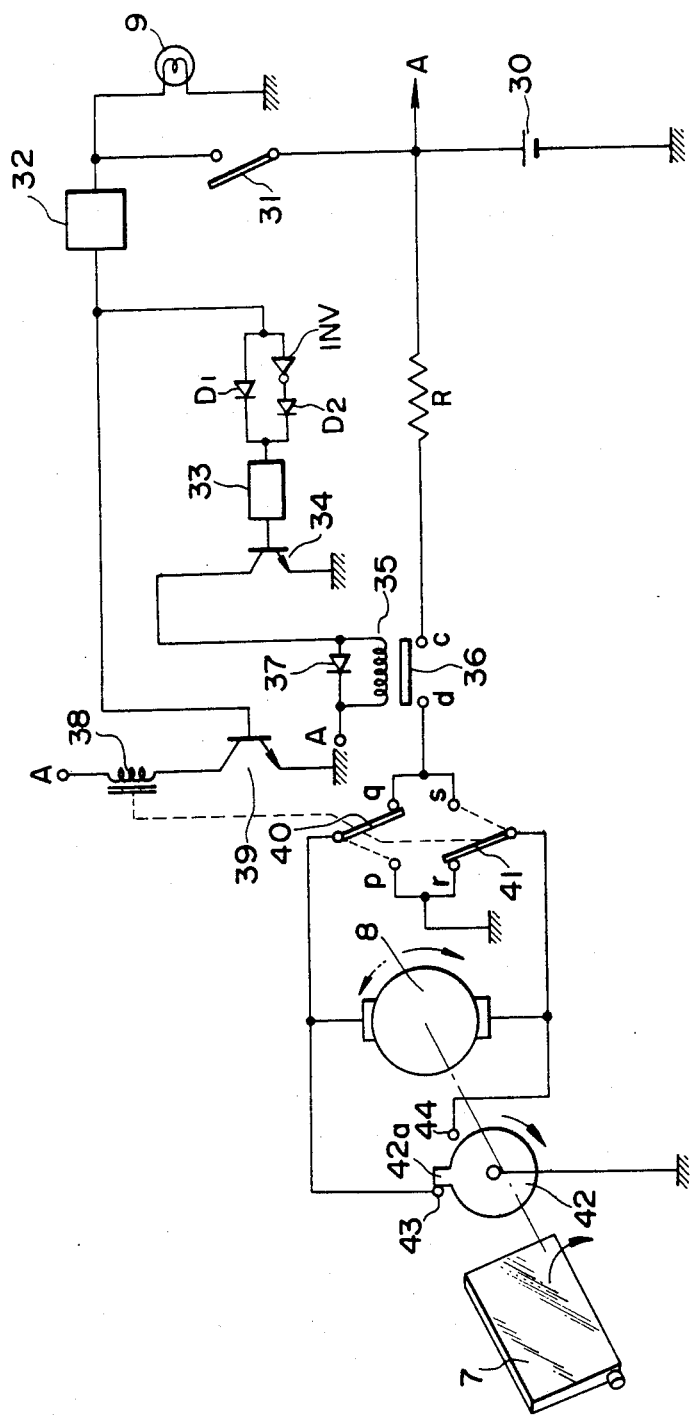
FIG. 5 is a circuit diagram of means for driving the light introducing means shown in FIG. 4.

FIG. 5 shows an example of a means for driving the light introducing member 7. In the circuit configuration shown in FIG. 5, a switch 31 connected in series with a battery 30 for turning on the vehicle headlights is closed to turn on the light source 9 for illuminating the liquid crystal and to energize the motor 8 to move the light introducing member 7 from the daytime illumination position to the nighttime illumination position. Numeral 32 designates a DC-DC convertor which converts the voltage at the on-and-off position of the switch 31 into the voltage of the corresponding TTL level. Numeral 33 designates a timer which provides a signal for a time interval somewhat longer than required to drive the light introducing member 7. Two diodes $D_1$ and $D_2$ and an invertor INV are provided to start operation upon the change of the output voltage of the DC-DC convertor 32, that is, the change of the on-off position of the switch 31. A signal outputted from the timer 33 drives a transistor 34 to excite a relay coil 35 thus closing relay switch 36. The base of the transistor 34 is connected to the output terminal of the timer with its emitter grounded. Numeral 37 designates a diode provided for preventing the relay switch 36 from chattering. Numeral 38 designates another relay coil, one end of which is connected to the battery 30, and the other end of which is connected to the collector of a transistor 39. When the relay coil 38 is energized, the switches 40 and 41 are operated. The base of the transistor 39 is connected to the output terminal of the DC-DC convertor 31. The switch 40 is switched between two contacts p and q and the switch 41 is switched between two contacts r and s. The contacts p and r are grounded, and the contacts q and s are connected together to the contact d of the relay switch 36. Another contact c of the relay switch 36 is connected to the positive electrode of the battery 30. Numeral 8 designates a motor for driving the light introducing member 7. Numeral 42 designates a conductive contacting disc having a projection 42a on the circumference. The contacting disc 42 is grounded. A contact 43 comes into contact with the projection 42a when the light introducing member 7 is in the daytime illumination position. A contact 44 comes in to contact with the projection 42a when the light introducing member 7 is in the nighttime illumination position. The contact 43 is connected to one end of an armature winding of the motor 8 and to the switch 40. Contact 44 is connected to the other end of the motor 8 and to the switch 41. A resistor R for adjusting the applied voltage to the motor 8 is inserted between the contact c and positive pole of the battery 30.

The following describes how the light introduction member is operated with reference to FIG. 5. Suppose that the light introducing member 7 is in the daytime illumination position shown in FIG. 2. When it becomes dark, the driver closes the switch 31 to turn on the vehicle headlights and simultaneously turning on the light source 9 for illuminating the liquid crystal display unit. At this time, the output voltage from the DC-DC convertor 32 causes the transistor 39 to turn on so that the relay coil 38 is energized. Consequently, the switch 40 is switched from the contact q to the contact p, and the bar switch 41 is switched from the contact r to the contact s. The voltage signal is inputted to the timer 33 so that the transistor 34 is turned on and the relay coil 35 is energized to close the relay switch 36. Consequently, the power from the battery 30 is supplied to the motor 8 and the motor 8 rotates clockwise as shown by the solid arrow, whereby the contacting disc 42 and light introducing member 7 are turned clockwise as shown by the solid arrow. Consequently, the light introducing member 7 arrives at a position adjacent to the diffusion plate 6, that is, the nighttime illumination position. In this position, the projection 42a comes into contact with the contact 44 so that the power from the battery 30 does not pass the motor 8 to stop. After a predetermined interval, the output voltage of the timer 33 becomes zero so that the relay coil 36 is deenergized to interrupt the power supply for the motor 8. Hence, the light introducing member 7 is transferred from the daytime illumination position to the nighttime illumination position. When it becomes light, the driver opens the switch 31 to turn off the vehicle headlights and simultaneously turning off the liquid crystal display device illumination light source. At this time, the motor 8 turns counterclockwise as shown by a broken arrow, and the light introducing member 7 is transferred from the nighttime illumination position to the daytime illumination position.

Figure 6:
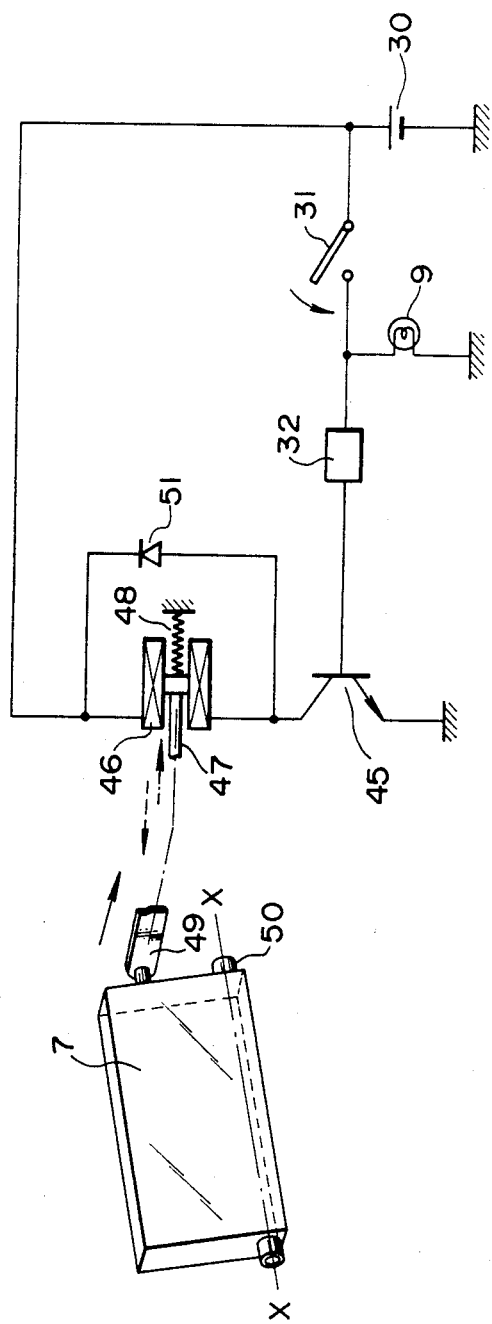
FIG. 6 is a circuit diagram of another embodiment of means for driving the light introducing means which is similar to FIG. 5.

FIG. 6 shows another example of a means for driving the light introducing member 7.

The switch 31 is closed to illuminate the light source 9 for illuminating the liquid crystal display device and simultaneously to turn on the transistor 45 via the DC-DC convertor 32. At this time, an electromagnet 46 is energized to attract a movable rod 47 positioned in the space between both magnetic poles in the rightward direction as shown by the solid arrow against the return force of a spring 49. Consequently, the light introducing member 7 is rotated about an axis line X—X through support pivots 50 to take the nighttime illumination position. Numeral 51 designates a diode connected across the electromagnet 46 to absorb the abrupt counter-electromotive force of the electromagnet 46. When the switch 31 is opened, the electromagnet 46 is deenergized. The light introducing member 7 then returns to the daytime illumination position as the spring 48 pushes the movable rod 47 in the direction shown by a broken arrow.

Figure 7:
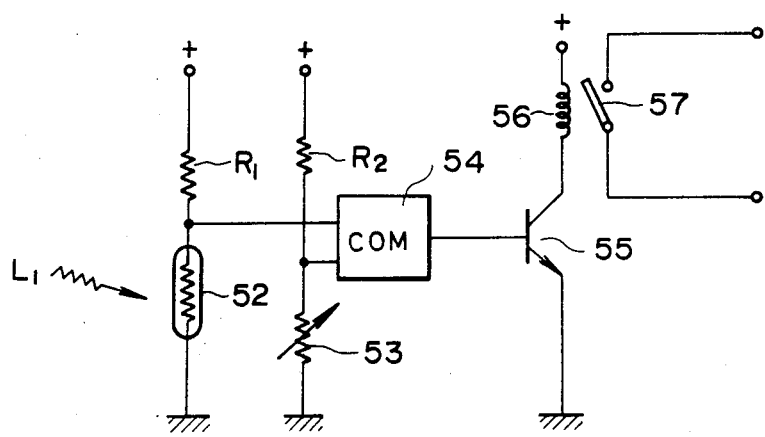
FIG. 7 is a circuit diagram of another embodiment of the present invention, where a signal for driving the light introducing means is obtained by sensing the luminosity of external light instead of being obtained by the operation of a light switch shown in FIGS. 5 and 6.

FIG. 7 shows another example of a means for outputting a drive signal to the light introducing member 7 instead of obtaining the signal by the operation of the switch 31. In this example, the drive signal is obtained from sensing the brightness of the external light.

Numeral 52 denotes a CdS (cadmium sulfide) photosensor element connected in series with the resistor $R_1$. Numeral 53 denotes a variable resistor connected in series with a resistor $R_2$. Numeral 54 denotes a comparator which compares the output voltage of the photosensor element 52 with the voltage divided with resistors $R_2$ and 53. Numeral 53 denotes a relay coil connected to the collector of the transistor 55. Numeral 57 denotes a relay contact which is opened or closed by the relay coil 56. In the circuit configuration shown in FIG. 7, when the incident light is low and the external light $L_1$ is decreased, the resistance of the CdS photosensor 52 is changed so that the voltage across the Cds photosensor 52 becomes lower than that divided by the resistors $R_2$ and 53. At this time, the output voltage of the comparator 54 goes high and the transistor 55 is turned on. Consequently, the relay coil 56 is energized and the switch 57 is closed.

It will now be appreciated from the foregoing description that the liquid crystal display unit according to the present invention is advantageous in that switching is made for illuminating the liquid crystal display device between an external incident light and illumination lamp.

What is claimed is:

1. A liquid crystal display unit for an automotive vehicle, comprising:
   (a) a liquid crystal display device having front and back sides and disposed within the vehicle so as to be viewed from the front side thereof;
   (b) a light source located at the back side of said liquid crystal device, said light source turning on depending on whether the vehicle headlights are illuminated;
   (c) a lens for collecting incident light rays from outside of the vehicle; and
   (d) a means for selectively introducing light rays into the back side of said liquid crystal display device from said light source, said introducing means comprising a transparent member provided with a reflective backing layer and being supported so as to be movable between a daytime illumination position in which the incident light rays from said collecting lens are introduced into the back side of said liquid crystal display device by the reflective backing layer and a nighttime illumination position in which the light rays emitted from said light source are alternatively introduced into the back side of said crystal display device by said reflective backing layer.

2. A liquid crystal display unit as claimed in claim 1, further comprising means for moving said light introducing member which is any one or a combination of a motor, vacuum actuator, or bimetallic strip.

3. A liquid crystal display unit as claimed in claim 1 or 2, wherein said collecting lens is a convex lens.

4. A liquid crystal display unit as claimed in claim 2, wherein said light introducing member moving means further comprises a switch for illuminating the vehicle headlights, said switch being closed to turn on said light source and to cause said light introducing member to move toward the position to give illumination from said light source to the back side of said liquid crystal display device and opened to turn off said light source and to cause said light introducing member to move toward the position to supply incident light to the back side of said liquid crystal display device.

5. A liquid crystal display unit as claimed in claim 2, wherein said light introducing member moving means comprises:
   means for detecting the brightness of the incident light;
   a comparator for comparing the brightness of the incident light with a predetermined value; and
   switching means turned on and off depending on the output of said comparator.

6. A liquid crystal display unit as claimed in claim 5, wherein said brightness detecting means is provided in the vicinity of said collecting lens.

* * * * *